United States Patent
Giacalone et al.

(10) Patent No.: US 7,164,920 B2
(45) Date of Patent: Jan. 16, 2007

(54) SYSTEM AND METHOD FOR SELECTING COMMUNICATIONS COVERAGE NETWORK INFORMATION IN A WIRELESS COMMUNICATIONS DEVICE

(75) Inventors: Joe Giacalone, San Diego, CA (US); Bilhan Kirbas, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 516 days.

(21) Appl. No.: 10/401,829

(22) Filed: Mar. 28, 2003

(65) Prior Publication Data
US 2004/0192328 A1   Sep. 30, 2004

(51) Int. Cl.
*H04Q 7/20* (2006.01)
(52) U.S. Cl. .................... 455/455; 455/450; 455/434
(58) Field of Classification Search ............ 455/450, 455/455, 456.1, 456.3, 456.6, 461, 515, 551, 455/552.1, 434
See application file for complete search history.

(56) References Cited

U.S. PATENT DOCUMENTS

| | | | |
|---|---|---|---|
| 6,085,085 A * | 7/2000 | Blakeney et al. ....... | 455/426.1 |
| 6,173,181 B1 * | 1/2001 | Losh ..................... | 455/434 |
| 6,185,436 B1 | 2/2001 | Vu | |
| 6,463,298 B1 * | 10/2002 | Sorenson et al. ........ | 455/552.1 |
| 6,516,188 B1 * | 2/2003 | New et al. ............... | 455/404.1 |
| 6,625,451 B1 * | 9/2003 | La Medica et al. ......... | 455/434 |
| 6,708,033 B1 * | 3/2004 | Linkola et al. ............. | 455/440 |
| 2003/0003922 A1 | 1/2003 | McClure | |
| 2003/0162533 A1 * | 8/2003 | Moles et al. ................ | 455/419 |
| 2004/0192304 A1 * | 9/2004 | Casaccia et al. ......... | 455/435.1 |
| 2004/0249915 A1 * | 12/2004 | Russell ...................... | 709/223 |

FOREIGN PATENT DOCUMENTS

EP          1223768 A1          7/2002

* cited by examiner

*Primary Examiner*—Benny Quoc Tieu

(57) ABSTRACT

A system and method are presented for expediting acquisition of an operating channel in a wireless communications telephone device. The method activates a wireless communications telephone device and identifies the wireless device geographical location. The method correlates a Number Assignment Module (NAM) with geographical location information and selects the NAM. The method also correlates a predetermined group of channels in a Priority Roaming List (PRL) in the selected NAM with geographical location information and selects the channel group. The method scans channels in the PRL beginning with channels in the selected channel group.

20 Claims, 3 Drawing Sheets

SYSTEM AND METHOD FOR SELECTING COMMUNICATIONS COVERAGE NETWORK INFORMATION IN A WIRELESS COMMUNICATIONS DEVICE

BACKGROUND OF THE INVENTION

1. Field of the Invention

This invention generally relates to wireless communications telephone devices and, more particularly, to a system and a method for acquiring a channel when activating a wireless telephone device.

2. Description of the Related Art

When a wireless communications telephone device is first activated, the wireless device must obtain initialization information and a list of channels to which the wireless device can connect. The initialization information enables the wireless device to find a suitable radio carrier channel and obtain carrier system information. The initialization information is typically included in a Number Assignment Module (NAM) pre-loaded into the wireless device memory. The appropriate NAM also can be loaded by the wireless device user into the wireless device using a wireless device user interface. If more than one NAM is pre-loaded in wireless device memory, it is known to have the wireless device user manually select a NAM appropriate for the current wireless device location. However, the wireless device does not include a means for automatically selecting the appropriate NAM. NAMs generally cover relatively large geographical areas, such as a metropolitan region. Within these geographical areas there can be a large number of cells or coverage areas. A Priority Roaming List (PRL) in the NAM typically includes a listing of channel groups. Each channel group is associated with a channel coverage area within the area covered by the NAM and includes the channels for the respective channel coverage area. Typically, a wireless telephone user has a contract for services from a particular carrier or provider. Each network carrier has preferences regarding the channels a wireless device acquires in a given channel coverage area. Therefore, the channels in a given channel group are listed according to the carrier's preference. The PRL also includes system information such as base station Network Identification (NID).

Once initialization information, such as the wireless device telephone number, is loaded, the wireless device begins the process of acquiring a channel by scanning the channels listed in the PRL. In general, the wireless device begins with the first channel group in the PRL and scans additional groups in the order in which the groups are listed in the PRL. The wireless device scans the channels to acquire a pilot signal with sufficient signal strength. After acquiring a pilot signal, the wireless device acquires the associated synch signal containing system information for the pilot signal channel, such as the NID and the System Identification (SID). The wireless device then compares the synch signal system information with system information listed for the channel in the PRL. If the system information matches, the pilot signal is from a base station within the coverage area for the current wireless device location and the wireless device acquires the pilot signal channel. Otherwise, the pilot signal is from a base station outside the coverage area and the wireless device begins scanning again, starting with the next channel listed in the PRL.

In some cases, the wireless device contains a Most Recently Used Table (MRU) listing the channels to which the wireless device has most recently been connected. Upon activation, the wireless device can begin scanning channels listed in the MRU. If the wireless device has not moved too far from the location in which it was last deactivated, a suitable channel may be found in the MRU. Otherwise, the MRU is no longer useful (that is, the channels in the MRU are for coverage areas other than the coverage area in which the wireless device is currently located) and the wireless device must scan channels in the PRL as noted above.

Once a wireless device acquires a channel as described above, there are known handoff procedures that enable the wireless device to acquire different channels as the wireless device moves among various cells within a selected NAM coverage area. However, if the wireless device moves into an adjoining NAM coverage area, the known handoff procedures cannot be used since the selected NAM does not contain initialization information or a PRL for the adjoining NAM. In this case, the wireless device goes into deep sleep. That is, the wireless device continues to scan for a pilot signal associated with the selected NAM, but increases the time period between scans to minimize battery usage. It is known to manually load a new NAM when leaving the coverage area for a selected NAM. However, as noted above, the wireless device cannot automatically select an appropriate NAM.

A PRL can contain a large number of channels. Therefore, acquiring a channel by scanning channels, beginning at the top of the PRL, can take a significant amount of time, particularly if the desired channel group is near the end of the channel group listings in the PRL. Unfortunately, the wireless device is unable to carry out communications functions, such as receiving pages, while scanning channels from the PRL. Therefore, during PRL channel scans, wireless device users are deprived of the use of their devices and carriers are deprived of revenue-generating activity. These same disadvantages also apply to the case in which a wireless device moves out of the coverage area for a selected NAM and loses its operating channel. In addition, lengthy scan times place an extra burden on wireless device batteries.

It would be advantageous if the time needed to acquire a channel when activating a wireless device could be reduced.

SUMMARY OF THE INVENTION

The present invention addresses acquisition of an operating channel in a wireless communications telephone device. The invention recognizes that acquiring a channel by scanning channels in a Preferred Roaming List (PRL) can take a significant amount of time. The invention also recognizes that the wireless device is unable to carry out communications functions, such as receiving pages, while scanning channels from the PRL. The invention addresses these problems by using geographical location information for the wireless device to select a Number Assignment Module (NAM) corresponding to the current wireless device location. The invention also uses the geographical location information to identify channels in the PRL for the selected NAM.

Accordingly, a method is provided for expediting acquisition of an operating channel in a wireless communications telephone device. The method activates a wireless communications telephone device and identifies the wireless device geographical location. The method correlates a NAM with geographical location information and selects the NAM. The method also correlates a predetermined group of channels in a Priority Roaming List (PRL) in the selected NAM with geographical location information and selects the channel group. The method scans channels in the PRL beginning with channels in the selected channel group.

Additional details of the above-described method, and a system for expediting acquisition of an operating channel in a wireless communications telephone device are provided below.

DETAILED DESCRIPTION OF THE PREFERRED EMBODIMENTS

Figure 1:
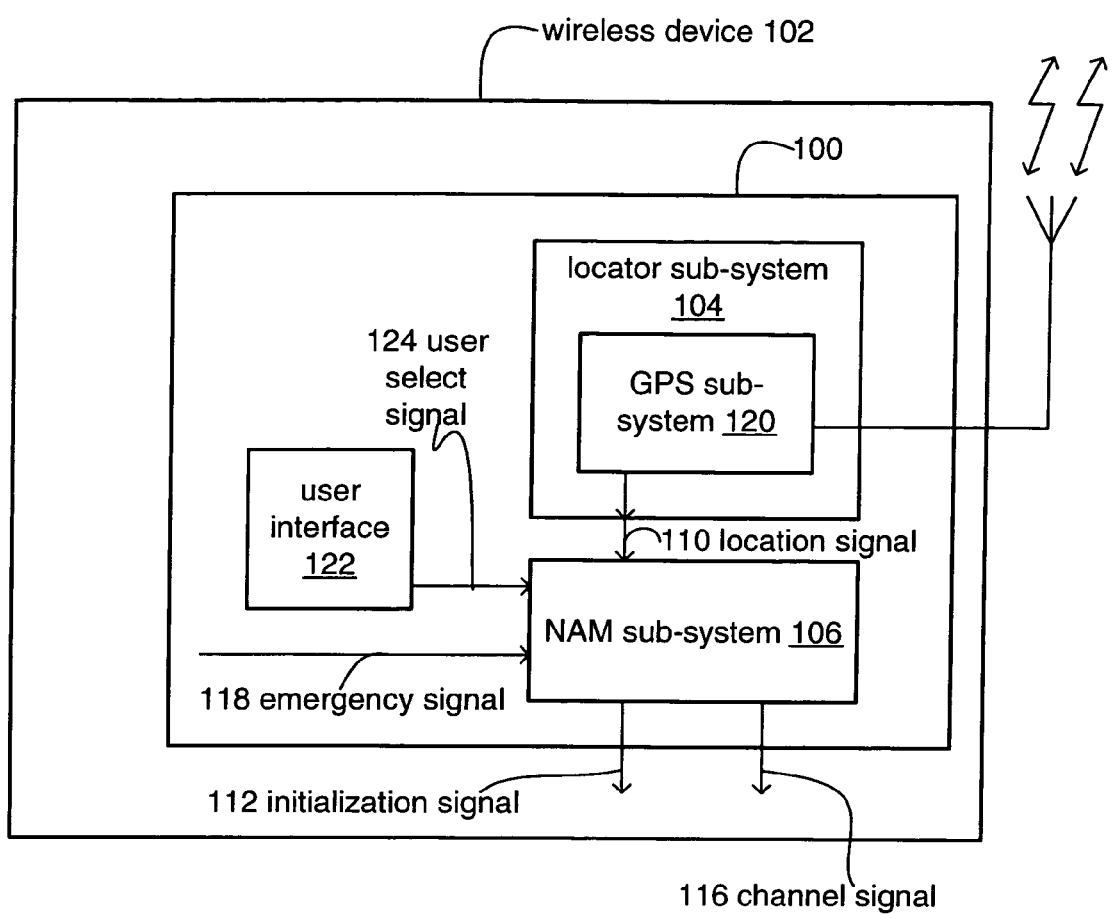
FIG. 1 is a schematic block diagram depicting a system for expediting acquisition of an operating channel in a wireless communications telephone device in accordance with the present invention.

FIG. 1 is a schematic block diagram depicting a system 100 for expediting acquisition of an operating channel in a wireless communications telephone device in accordance with the present invention. The system 100 is applicable to a wireless communications telephone device 102. As noted in the above Background Section, when a wireless device is first activated, the wireless device must access initialization information from a Number Assignment Module (NAM) appropriate for the current location of the wireless device and acquire a channel listed in the appropriate NAM. The system 100 enables the wireless device 102 to determine and access this NAM and expedites the acquisition of a channel listed in this NAM. The system 100 includes a locator sub-system 104 and a NAM sub-system 106. The locator sub-system 104 identifies the current geographical location of the wireless device 102 and supplies, at intervals, the location in a location signal from an output on line 110. The locator sub-system 104 can supply location signals at periodic intervals, the frequency of which can be adjusted to meet individual application requirements. The location signal contains a point in a coordinate system defining the wireless device geographical location.

The NAM sub-system 106 includes at least one NAM. Each NAM in the NAM sub-system 106 is correlated with geographical location information defining the coverage area for the respective NAM. That is, for a typical two-dimensional orthogonal plane coordinate system, each NAM would be referenced to the coordinate points within the coverage area for the NAM. The number of such coordinate points depends on the size of the coverage area and the scale of the coordinate system. It is understood that the system 100 is not limited to any particular coordinate system. The NAM sub-system 106 has a first input to accept the location signal on line 110. The NAM sub-system 106 determines which of the NAMs in storage corresponds to the coordinate system point in the location signal and selects that NAM. The NAM sub-system 106 includes an output to supply initialization information from the selected NAM on line 112.

Each NAM in the NAM sub-system 106 includes a Priority Roaming List (PRL) with predetermined groups of channels. As noted in the above Background Section, after a wireless device has selected the appropriate NAM, the device begins the process of scanning channel groups listed in the PRL for the selected NAM. As was described above for the NAMs in the NAM sub-system 106, the channel groups in the NAMs in sub-system 106 are correlated with geographical location information defining a coverage area for each channel group. The NAM sub-system 106 determines which of the channel groups in the PRL for the selected NAM corresponds to the coordinate system point in the location signal and selects that channel group. The NAM sub-system 106 supplies the channels listed in the selected channel group in a channel signal on an output on line 116. In this manner, the wireless device 102 avoids the time-consuming process of scanning channels starting at the beginning of the channel group listings in the PRL regardless of the location of the wireless device within the coverage area for the NAM. That is, the scanning begins with those channels known to be associated with the carrier cell within which the wireless device 102 is located. As noted in the above Background Section, carriers have a preferred order for acquiring channels in a channel group coverage area, and the channels in the selected channel group are presented in the carrier preferred order in the channels signal.

As described in the above Background Section, a wireless device typically goes into deep sleep when moving out of the selected NAM coverage area. However, if the wireless device 102 moves out of the selected NAM coverage area, the NAM sub-system 106 selects a new NAM and a new PRL channel group, as described above, using location information in the updated location signal.

E911 Phase II includes position location requirements. That is, a wireless device placing a 911 emergency call is supposed to supply location information within a predetermined period of time. One way to supply this location information is to acquire a Code Division Multiple Access (CDMA) channel. However, a typical pattern for acquiring a channel for a 911 call is biased toward acquiring an Advanced Mobile Phone Service (AMPS) channel. The system 100 is used to increase the probability of acquiring a CDMA channel for a 911 call. The NAM sub-system has an input to accept an emergency signal on line 118, the emergency signal indicating that an emergency call has been placed from the wireless device 102. In response to accepting the emergency signal on line 118 and the location signal on line 110, the NAM sub-system 106 supplies the channel signal on line 116 as follows. For a predetermined period of time, only CDMA channels from the selected channel group are included in the channel signal, allowing the wireless device 102 the opportunity to acquire a CDMA channel and supply E911 Phase II position location information. However, the location information requirements must be balanced with the need to contact emergency personnel as soon as possible, hence the restriction of a predetermined period of time in which to acquire a CDMA channel. Determining the length of the predetermined time period falls outside the scope of system 100. If the wireless device 102 does not acquire a CDMA channel by the end of the predetermined time period, the NAM sub-system 106 supplies all channels from the selected PRL channel group. That is, the wireless device 102 then acquires the first available channel, regardless of the ability of the channel to provide location information.

In some embodiments, the locator sub-system 104 includes a Global Positioning System (GPS) sub-system 120. The GPS sub-system 120 receives GPS position information for the wireless device 102 from GPS satellites (not shown) and supplies the GPS information to an output connected to the locator sub-system 104 output on line 110.

The locator sub-system 104 supplies the GPS position information in the location signal. Alternately, the locator sub-system 104 accepts location position information from an external source (not shown).

As described in the above Background Section, a user interface can be used to manually select a NAM from wireless device memory. Therefore, the system 100 also includes a user interface 122 with an output to supply a user select signal on line 124 identifying a NAM stored in the NAM sub-system 106. The NAM sub-system 106 includes an input to accept the user select signal on line 124 and selects the NAM identified in the user select signal. Following the selection of the NAM, the initialization and channel signals are supplied by the NAM sub-system 106, as described above.

Figure 2:
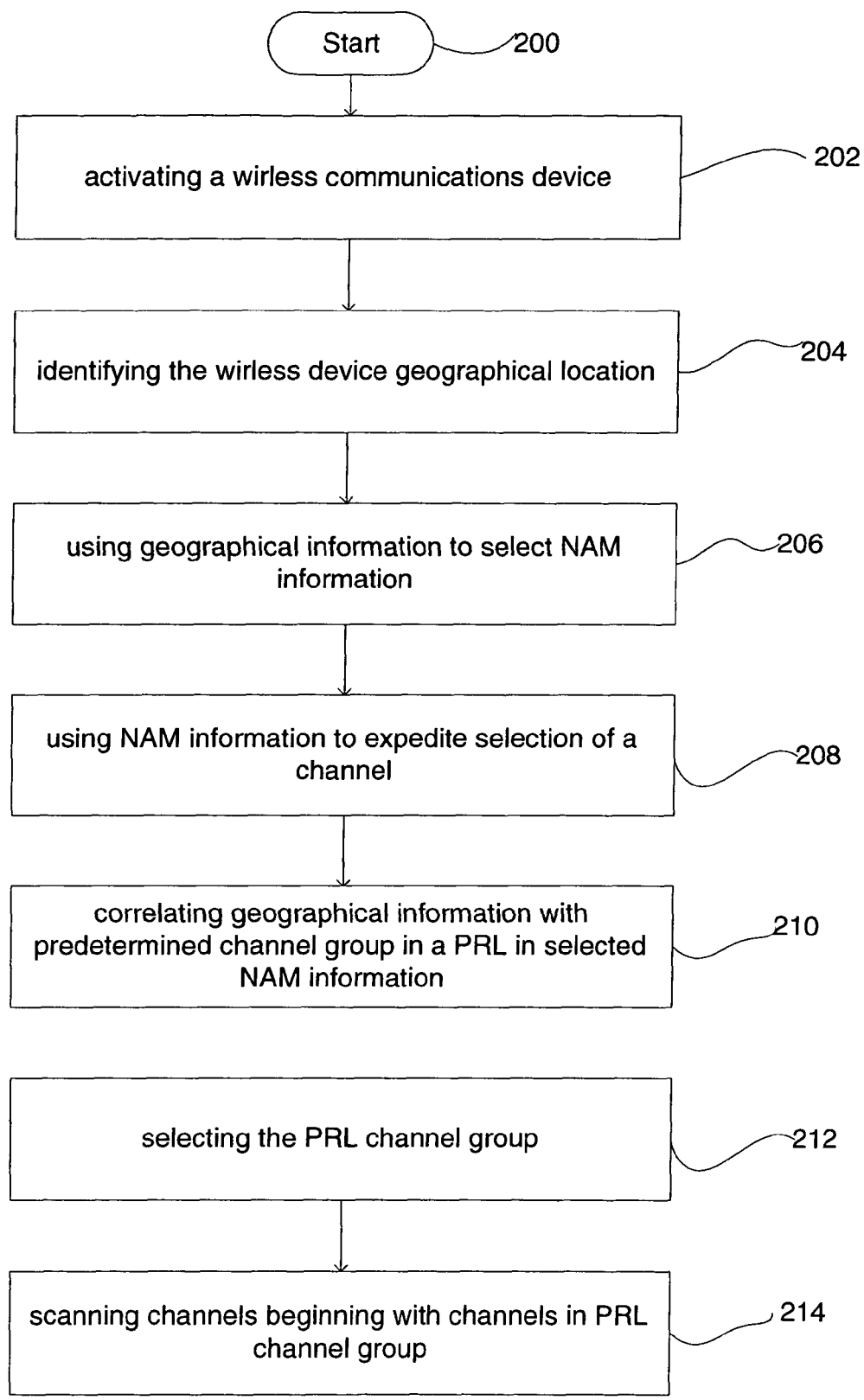
FIG. 2 is a flow chart illustrating the method for expediting acquisition of an operating channel in a wireless communications telephone device in accordance with the present invention.

FIG. 2 is a flow chart illustrating the method for expediting acquisition of an operating channel in a wireless communications telephone device in accordance with the present invention. Although the method in FIG. 2 (and FIG. 3 below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 200. Step 202 activates a wireless communications telephone device. Step 204 identifies the current wireless device geographical location. Step 206 uses the geographical location information to select NAM information. Step 208 uses the selected NAM information to expedite acquisition of an operating channel. Step 210 correlates the geographical location information with a predetermined group of channels in a PRL in selected NAM information. Step 212 selects the PRL channel group. Step 214 scans channels in the PRL beginning with channels in the PRL channel group.

In one aspect of the method, activating a wireless communications telephone device in Step 202 includes activating a wireless communications device to make an emergency 911 call. Then, scanning channels in the PRL beginning with channels in the PRL channel group in Step 214 includes: scanning only Code Division Multiple Access (CDMA) channels for a predetermined period of time; and, scanning any channel in the PRL channel group after the wireless device fails to acquire a CDMA channel within the predetermined period of time.

In another aspect of the method, identifying the current wireless device geographical location in Step 204 includes receiving Global Positioning System (GPS) position information and using the GPS position information to identify the wireless device geographical location.

Figure 3:
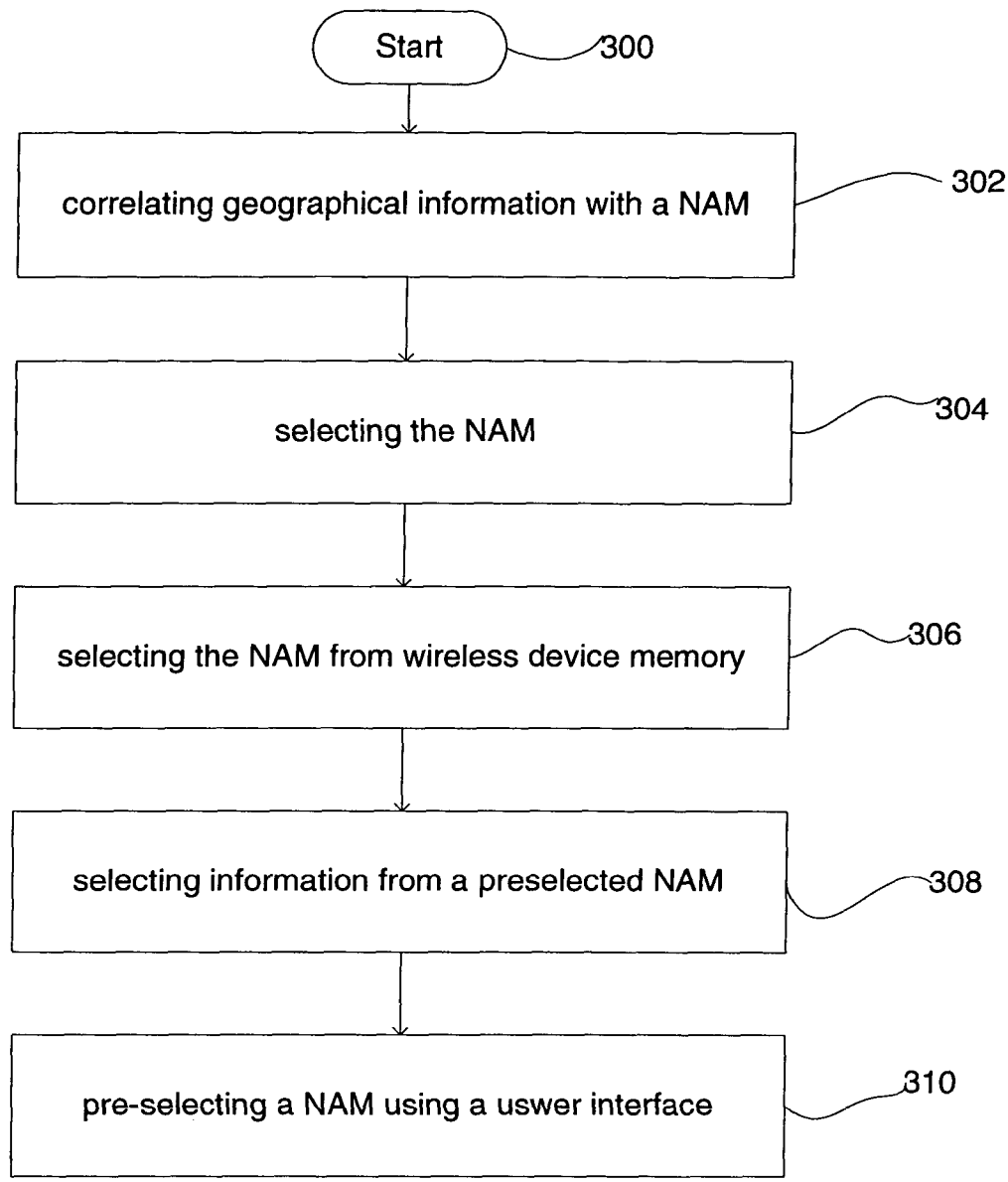
FIG. 3 is a flow chart further showing the method illustrated in FIG. 2.

FIG. 3 is a flow chart further showing the method illustrated in FIG. 2. The method starts at Step 300. Step 302 correlates the geographical location information with a NAM. Step 304 selects the NAM. Step 306 selects the NAM from wireless device memory. Step 308 selects information from a pre-selected NAM. Step 310 pre-selects the NAM using a wireless device user interface.

A system and a method are provided for expediting acquisition of an operating channel in a wireless communications telephone device. Examples of the present invention have been enabled with a wireless communications telephone device. However, it should be understood that the present invention is not limited to wireless telephone devices. The present invention system and method are applicable to any wireless communications device and to any portable device that selects location dependent information. Other variations and embodiments of the present invention will occur to those skilled in the art.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

We claim:

1. A method for expediting acquisition of an operating channel in a wireless communication device, the method comprising:
   determining a current physical location of the wireless communication device;
   corresponding the current physical location to a specific coordinate system point of a plurality of coordinate system points within a geographical coverage area;
   selecting a first Number Assignment Module (NAM) of a plurality of NAMs stored in the wireless communication device that corresponds to the geographical coverage area, the first NAM comprising a priority roaming list (PRL) of prioritized channel groups;
   selecting at least one channel group of the prioritized channel groups of the first NAM that corresponds to the specific coordinate system point of the geographical coverage area;
   scanning the selected at least one channel group that corresponds to the specific coordinate system point to expedite the acquisition of the operating channel; and
   scanning other channel groups of the prioritized channel groups that do not correspond to the specific coordinate system point if the wireless communication device fails to acquire the operating channel after scanning the selected at least one channel group.

2. The method of claim 1, wherein the step of determining the current physical location is a periodic determination, further comprising:
   updating the specific coordinate system point to correspond to the periodically determined current physical location; and
   reselecting the at least one channel group of the prioritized channel groups that corresponds to the updated specific coordinate system point; and
   scanning the reselected at least one channel group to expedite the acquisition of the operating channel.

3. The method of claim 1, further comprising
   activating the wireless communication device to make an emergency E911 call; and,
   wherein scanning the selected at least one channel group that corresponds to the specific coordinate system point comprises:
   scanning only Code Division Multiple Access (CDMA) channels of the selected at least one channel group for a predetermined period of time; and
   scanning any channel of the selected at least one channel group if the wireless communication device fails to acquire an available CDMA channel of the CDMA channels within the predetermined period of time.

4. The method of claim 1, wherein determining the current physical location of the wireless communication device comprises:
   receiving Global Positioning System (GPS) position information from a GPS module in the wireless communication device; and, determining the current physical local location of the wireless communication device based upon the GPS position information.

5. The method of claim 1, wherein a total number of the plurality of coordinate system points varies according to a coverage area size of the geographical coverage area.

6. The method of claim 1, further comprising a first step of:
    activating the wireless communication device.

7. A method for expediting acquisition of an operating channel in a wireless communication device, the method comprising:
    (a) activating the wireless communication device;
    (b) receiving Global Positioning System (GPS) position information;
    (c) corresponding the GPS position information to a current geographic area of a plurality of geographic areas stored in the wireless communication device;
    (d) corresponding the GPS position information to a current coordinate system point of a plurality of coordinate system points associated with the current geographic area;
    (e) selecting a Number Assignment Module (NAM) corresponding to the current geographic area, the NAM having a priority roaming list (PRL) comprising a plurality of channel groups;
    (f) selecting at least one first-scan channel group of the plurality of channel groups that is associated with the current coordinate system point; and
    (g) scanning the plurality of channel groups of the PRL in an acquisition-expediting order beginning with the at least one first-scan channel group.

8. The method of claim 7, wherein the plurality of channel groups of the PRL have a priority order, and wherein the acquisition-expediting order is different than the priority order.

9. The method of claim 7, wherein the GPS position information is received from a GPS module within the wireless communication device.

10. The method of claim 7, wherein the GPS position information is received periodically, further comprising: repeating steps c–g when the wireless communication device is acquiring a new operating channel.

11. A system for expediting acquisition of an operating channel in a wireless communication device, the system comprising:
    a locator sub-system for determining a current physical location of the wireless communication device and for associating the current physical location with a coordinate system point in a coverage area;
    a Number Assignment Module (NAM) sub-system connected to the locator sub-system, comprising:
        a memory for storing a plurality of Number Assignment Modules (NAMs), each NAM of the plurality of NAMs having a priority roaming list (PRL) of prioritized channel groups;
        a correlator for correlating the coverage area of the current physical location to a first Number Assignment Module (NAM) of the plurality of NAMs;
        the correlator for correlating the coordinate system point of the current physical location with at least one channel group of the prioritized channel groups of the first NAM; and
        an output line for supplying the correlated at least one channel group of the first NAM to a wireless communication interface to initiate scanning for the operating channel, and for supplying other channel groups of the prioritized channel groups of the first NAM that do not correlate to the coordinate system point if the wireless communication interface fails to acquire the operating channel after scanning the correlated at least one channel group.

12. The system of claim 11, wherein the NAM sub-system outputs only Code Division Multiple Access (CDMA) channels of the correlated at least one channel group on the output line for a predetermined period of time upon detection of an emergency call initiated from the wireless communication device, and outputs any channel of the correlated at least one channel group if the wireless communication device fails to acquire an available CDMA channel of the CDMA channels within the predetermined period of time.

13. The system of claim 11 wherein the locator sub-system includes a Global Positioning System (GPS) sub-system for supplying the current physical location.

14. The system of claim 11 further comprising:
    a user interface connected to the NAM sub-system for selecting a user-selected NAM of the plurality of NAMs; and,
    wherein the NAM sub-system substitutes the user-selected NAM as the first NAM.

15. The system of claim 11, wherein the locator sub-system is configured to periodically determine the current physical location.

16. A system for expediting acquisition of an operating channel in a wireless communication device, the system comprising:
    a locator sub-system having a Global Positioning System (GPS) for identifying a current geographical location of a plurality of possible geographical locations of the wireless communication device, the locator sub-system for determining a current coordinate system point within a current coverage area of a plurality of pre-defined coverage areas associated with the current geographical location, and for supplying the current coordinate system point and the current coverage area in a location signal on a locator sub-system output; and,
    a NAM sub-system connected to the locator sub-system output, comprising:
        a first input for accepting the location signal;
        at least one Number Assignment Module (NAM) comprising a plurality of NAMs, each NAM pre-associated with a coverage area of the plurality of pre-defined coverage areas;
        a correlator for correlating the current coverage area with a first NAM of the plurality of NAMS, the correlated first NAM having an associated priority roaming list (PRL), the associated PRL having a plurality of channel groups;
        the correlator for further correlating the current coordinate system point with at least channel group of the plurality of channel groups of the associated PRL; and
        a first output for supplying a channel signal comprising the correlated at least one channel group for initiating the acquisition of the operating channel.

17. The system of claim 16, wherein the channel signal is supplied on the first output in response to the NAM sub-system accepting the location signal from the locator sub-system output.

18. The system of claim 16, wherein the locator sub-system is configured to periodically determine the current geographical location.

19. The system of claim 16, wherein the NAM sub-system further supplies the plurality of channel groups of the associated PRL in addition to the correlated at least one channel group.

20. The system of claim 16, wherein the NAM sub-system further comprises a second input to accept an emergency signal indicating that an emergency call has been placed from the wireless communication device; and, wherein in response to accepting the emergency signal, the channel signal supplied on the first output by the NAM sub-system comprises:

only Code Division Multiple Access (CDMA) channels from the correlated at least one channel group of the associated PRL for a predetermined period of time; and, all channels from the correlated at least one channel group of the associated PRL if the wireless communication device fails to acquire a CDMA channel within the predetermined period of time.

* * * * *